(12) United States Patent
Lee et al.

(10) Patent No.: US 11,459,693 B2
(45) Date of Patent: Oct. 4, 2022

(54) SENSOR MODULE AND LAUNDRY TREATING APPARATUS HAVING THE SAME

(71) Applicant: LG Electronics Inc., Seoul (KR)

(72) Inventors: Kilryong Lee, Seoul (KR); Junyoung Kim, Seoul (KR); Bokyung Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 253 days.

(21) Appl. No.: 16/751,553

(22) Filed: Jan. 24, 2020

(65) Prior Publication Data

US 2020/0248384 A1    Aug. 6, 2020

(30) Foreign Application Priority Data

Feb. 1, 2019 (KR) .................. 10-2019-0013903

(51) Int. Cl.
*D06F 39/08* (2006.01)
*D06F 34/22* (2020.01)
(Continued)

(52) U.S. Cl.
CPC ............ *D06F 39/087* (2013.01); *D06F 34/22* (2020.02); *D06F 39/083* (2013.01); *G01F 23/16* (2013.01);
(Continued)

(58) Field of Classification Search
CPC ........ G01D 21/02; G01D 11/30; G01P 1/023; D06F 18/00; D06F 25/00; D06F 33/00; D06F 33/47; D06F 33/48; D06F 33/74; D06F 33/76; D06F 34/08; D06F 34/16; D06F 34/22; D06F 35/00–008; D06F 37/00; D06F 37/20; D06F 37/203; D06F 37/22; D06F 37/225; D06F 37/24; D06F 37/245; D06F 39/00; D06F 39/087; D06F 58/00; D06F 58/02; D06F 58/04; D06F 58/20; D06F 58/203; D06F 58/30;
(Continued)

(56) References Cited

U.S. PATENT DOCUMENTS

2010/0139011 A1\* 6/2010 Kim .................. D06F 33/43
8/159
2012/0017648 A1\* 1/2012 Kwon .................. D06F 37/22
68/140
(Continued)

FOREIGN PATENT DOCUMENTS

WO    WO-2018066929 A2 \* 4/2018 ............. D06F 37/30

*Primary Examiner* — David G Cormier
(74) *Attorney, Agent, or Firm* — Fish & Richardson P.C.

(57) ABSTRACT

The present disclosure relates to a sensor module and a laundry treating apparatus including the same. The laundry treating apparatus includes a cabinet forming an outer shape of the apparatus, a tub disposed inside the cabinet in a vibrating manner, a drum rotatably disposed inside the tub, a motor disposed on the tub to rotate the drum, a water supplier for supplying washing water to the tub, a water discharger for discharging the washing water in the tub, a sensor module detecting a water level of the washing water stored in the tub, and at the same time, detecting a vibration of the tub, and a sensor module mount disposed on a rear portion of a top of the tub, wherein the sensor module is detachably installed into the sensor module mount.

15 Claims, 9 Drawing Sheets

(51) Int. Cl.
  *G01H 1/00* (2006.01)
  *G01F 23/16* (2006.01)
  *D06F 103/26* (2020.01)
  *D06F 103/18* (2020.01)
(52) U.S. Cl.
  CPC ......... *G01H 1/003* (2013.01); *D06F 2103/18* (2020.02); *D06F 2103/26* (2020.02)
(58) Field of Classification Search
  CPC .. D06F 58/38; D06F 2103/00; D06F 2103/18; D06F 2103/20; D06F 2103/22; D06F 2103/26; D06F 2202/00; D06F 2202/085; D06F 2202/12; D06F 2204/00; D06F 2222/00
  See application file for complete search history.

(56) References Cited

U.S. PATENT DOCUMENTS

2013/0233027 A1\* 9/2013 Carrer ..................... D06F 34/16
  68/12.27
2019/0234989 A1\* 8/2019 Na ......................... G01C 19/56

\* cited by examiner

SENSOR MODULE AND LAUNDRY TREATING APPARATUS HAVING THE SAME

CROSS-REFERENCE TO RELATED APPLICATIONS

This application claims the benefit of Korean Patent Application No. 10-2019-0013903, Feb. 1, 2019, which is hereby incorporated by reference as when fully set forth herein.

BACKGROUND

Field

The present disclosure relates to a sensor assembly for a laundry treating apparatus and a mounting structure of the sensor assembly, and particularly to, a sensor module capable of detecting a vibration and a water level during washing and a laundry treating apparatus having the same.

Discussion of the Related Art

In general, laundry treating apparatus is an apparatus for washing laundry through processes of washing, rinsing, dehydration, and the like to remove contamination on clothes, beddings, and the like (hereinafter referred to as the 'laundry') accommodated in a drum using an action of washing water and detergent.

A tub for receiving the washing water therein is disposed in such laundry treating apparatus, the drum for receiving the laundry therein is rotatably mounted in the tub, and a motor for generating a driving force of the drum is mounted at one side of the tub.

In one example, the laundry treating apparatus according to the prior art described above includes a vibration sensor for detecting the vibration generated during the operation of the laundry treating apparatus and a water level sensor for detecting a water level of the washing water stored in the tub.

The vibration sensor and the water level sensor of the laundry treating apparatus are disclosed in Korean patent No. 10-0664072 and Korean patent application publication No. 10-2011-0013005, which are prior art.

The vibration sensor and the water level sensor disclosed in the prior art are respectively and individually installed in different installation positions of the tub as separate components and respectively detect the vibration and the water level of the tub.

In one example, in the case of the vibration sensor and the water level sensor as described above, the number of manufacturing processes of the laundry treating apparatus is increased based on the individual installation and each of which requires separate parts management, which are cumbersome.

SUMMARY

A purpose of the present disclosure is to solve the problem of the conventional laundry treating apparatus as mentioned above.

A purpose of the present disclosure is to provide a sensor module integrating a water level sensor for detecting a water level of washing water stored in the tub and a vibration sensor for detecting a vibration of a tub with each other and a laundry treating apparatus including the same.

Further, another purpose of the present disclosure is to provide a sensor module and a laundry treating apparatus including the same that use the sensor module that may detect a vibration and a water level of the tub at the same time to reduce processes when manufacturing the laundry treating apparatus.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One aspect of the present disclosure provides a laundry treating apparatus including a sensor module connected to the water level detecting pipe to detect a water level of the washing water stored in the tub, and at the same time, detect a vibration of the tub, and a sensor module mount disposed on one side of an outer circumferential face of a top of the tub, wherein the sensor module is detachably installed into the sensor module mount.

In one implementation, the sensor module mount is disposed on a front portion of the tub.

In one implementation, a mounting position of the sensor module is preferably in a space between the tub and an inner edge of the cabinet to improve a space utilization inside the laundry treating apparatus.

In one implementation, the sensor module mount is positioned on a front portion of the tub and at a position spaced, by an angular spacing of 30° to 60°, from a vertical line passing through a front center of the tub, and more preferably, the sensor module mount is positioned on the front portion of the tub and at a position spaced, by an angular spacing of about 40°, from the vertical line passing through the front center of the tub.

In one implementation, the water discharger includes an air chamber for detecting the water level of the tub, and the water level detecting pipe is formed at a position lower than the sensor module in a region between the air chamber and the sensor module.

In one implementation, the sensor module mount fixes the sensor module by preventing a movement of the mounted sensor module in a front and rear direction/a left and right direction/an up and down direction.

In one implementation, the sensor module mount includes a first guide having a first guide protrusion formed thereon for supporting one side face of the sensor module, and a second guide having a second guide protrusion formed thereon for supporting the other side face of the sensor module, and the first guide protrusion and the second guide protrusion restrict a movement of the sensor module in a left and right direction.

In one implementation, the sensor module mount may include a support formed between the first guide and the second guide and supporting a rear face of the sensor module, and an elastic pressing portion extending from the support to a front face of the sensor module and hooked by the front face of the sensor module, and the support and the elastic pressing portion restrict a movement of the sensor module in a front and rear direction.

In one implementation, the sensor module mount includes a first support step formed on the first guide and supporting one side of a bottom face of the sensor module, and a second support step formed on the second guide and supporting the other side of the bottom face of the sensor module, and the first and the second support steps and the elastic pressing portion restrict a movement of the sensor module in a up and down direction.

In one implementation, the sensor module mount includes a support for supporting a rear face of the sensor module, first and second guides extending from both sides of the support and supporting both side faces of the sensor module, respectively, and an elastic pressing portion formed on a top of the support and pressing the sensor module with a predetermined elastic force, and a hook protrusion mounted on a top of a front face of the sensor module is further formed on the elastic pressing portion.

In one implementation, first and second steps for respectively supporting both sides of a bottom face of the sensor module are respectively formed on the first and second guides, the elastic pressing portion elastically supports a top face of the sensor module, and first and second guide protrusions for respectively supporting the both side faces of the sensor module are further formed on faces of the respective first and second guides facing each other, respectively.

In one implementation, the sensor module includes a housing having a box shape in communication with the water level detecting pipe, a PCB substrate mounted inside the housing and including a pressure sensor for detecting a pressure of the water level detecting pipe, a vibration sensor for detecting the vibration of the tub, and a terminal for transmitting sensed values of the pressure sensor and the vibration sensor, and a cover for exposing the terminal, and at the same time, covering an opened portion of the housing.

In one implementation, the housing may include a box for defining a space having an opened bottom such that the PCB substrate is seated, and a pipe connector disposed rearward of the box and in communication with the space, wherein the water level detecting pipe is connected to the pipe connector.

In one implementation, the space in which the pressure sensor and the vibration sensor are arranged is divided into a pressure sensor space in communication with the water level detecting pipe, wherein the pressure sensor is disposed in the pressure sensor space, and a vibration sensor space separated from the pressure sensor space, wherein the vibration sensor is disposed in the vibration sensor space.

Another aspect of the present disclosure provides a sensor module including a housing connected with a water level detecting pipe changing in a pressure based on a change of a water level, wherein the housing includes a pressure sensor space in communication with the water level detecting pipe and a vibration sensor space separated from the pressure sensor space, a PCB substrate disposed inside the pressure sensor space and including a pressure sensor for detecting a pressure of the water level detecting pipe, a vibration sensor disposed in the vibration sensor space and detecting a vibration, and a terminal for transmitting sensed values of the pressure sensor and the vibration sensor, and a fixing cover for exposing the terminal, and at the same time, covering an opened portion of the housing.

In one implementation, a pipe connector defining therein a channel in communication with the pressure sensor space and in communication with an air of the water level detecting pipe is formed rearward of the box.

The features of the above-described implantations may be combined with other embodiments as long as they are not contradictory or exclusive to each other.

Effects of the present disclosure are as follows but are limited thereto:

According to the sensor module and the laundry treating apparatus provided including the same according to an embodiment of the present disclosure, the water level sensor for detecting the water level of the washing water being stored in the tub and the vibration sensor for detecting the vibration of the tub may be integrated.

In addition, according to the sensor module and the laundry treating apparatus including the same according to an embodiment of the present disclosure, the manufacturing processes of the laundry treating apparatus may be reduced using the sensor module that may simultaneously detect the vibration and the water level of the tub.

Effects of the present disclosure are not limited to the above effects. Those skilled in the art may readily derive various effects of the present disclosure from various configurations of the present disclosure.

DETAILED DESCRIPTIONS

Figure 1:
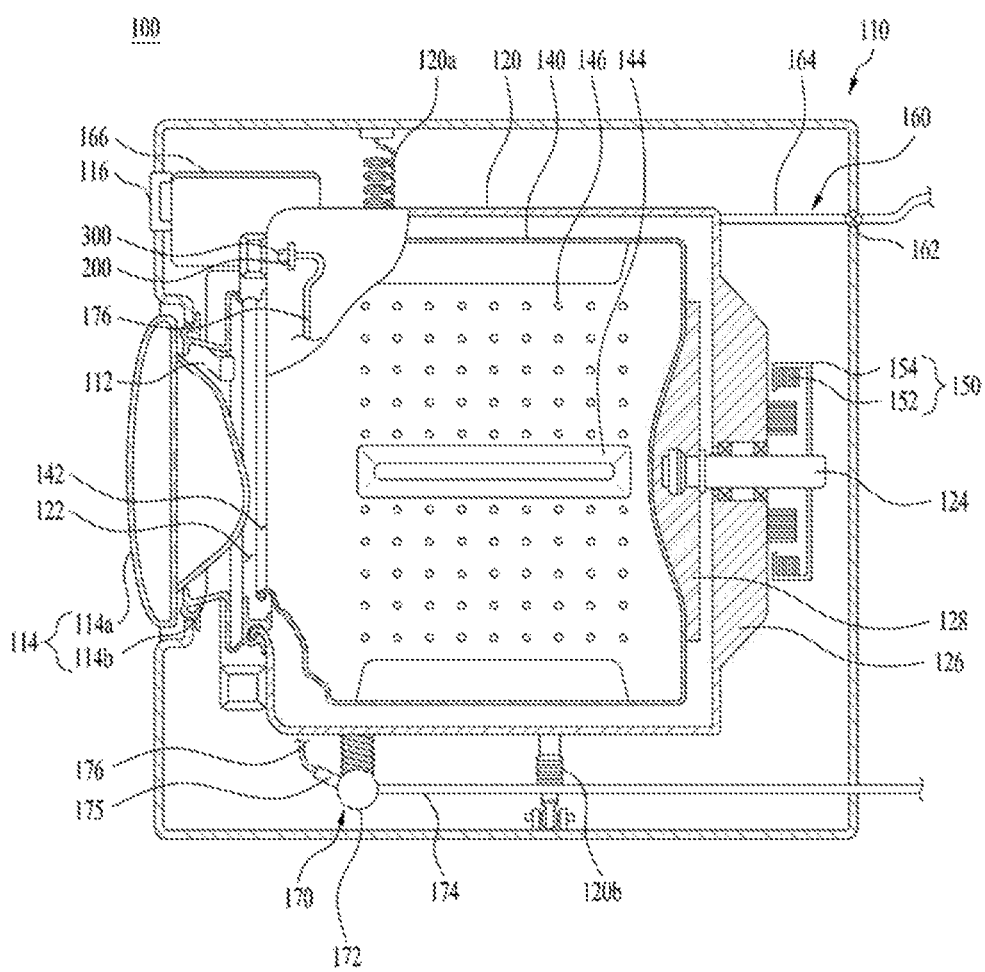
FIG. 1 is a simplified diagram illustrating a laundry treating apparatus according to an embodiment of the present disclosure.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
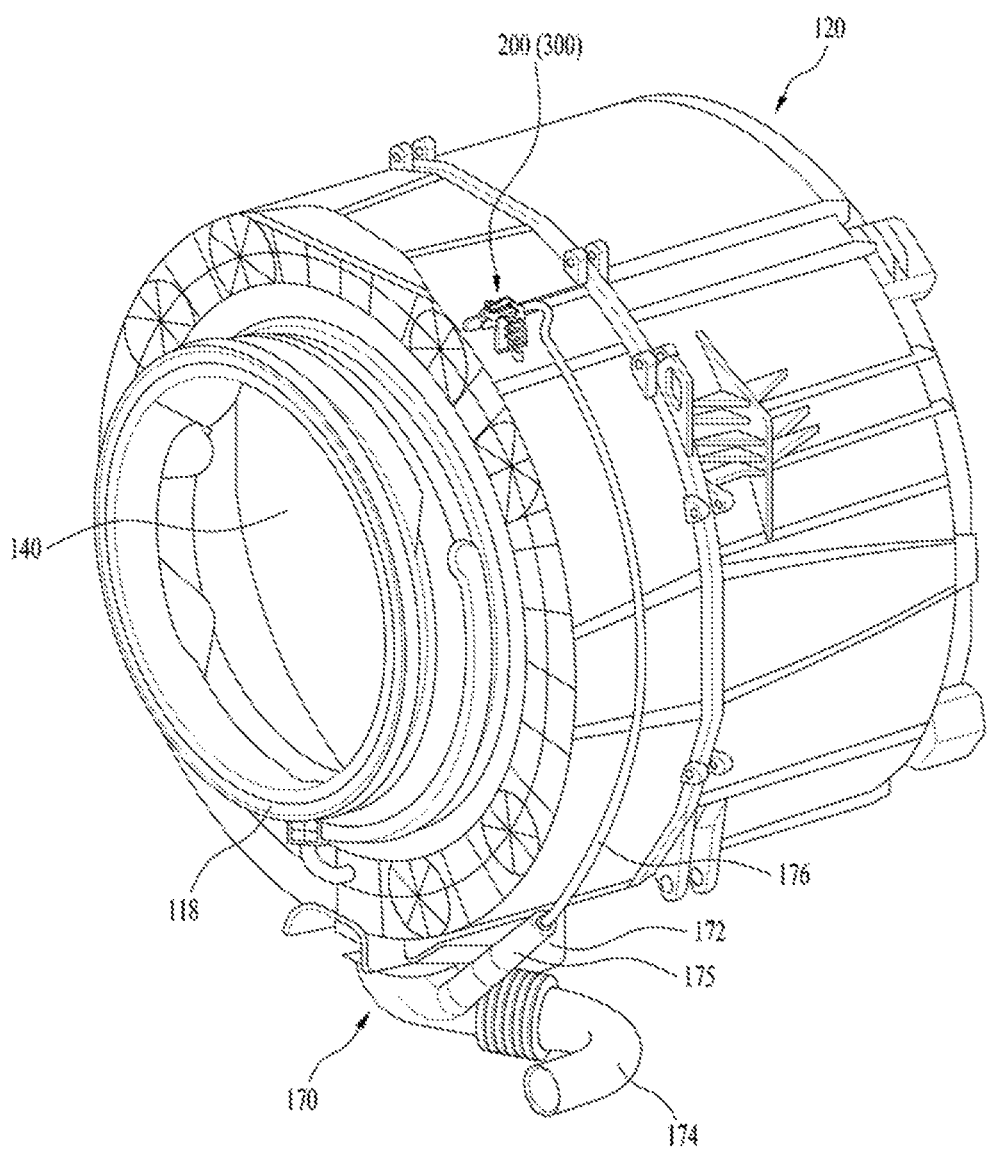
FIG. 2 is a perspective view illustrating a tub of a laundry treating apparatus according to an embodiment of the present disclosure.
Figure 3:
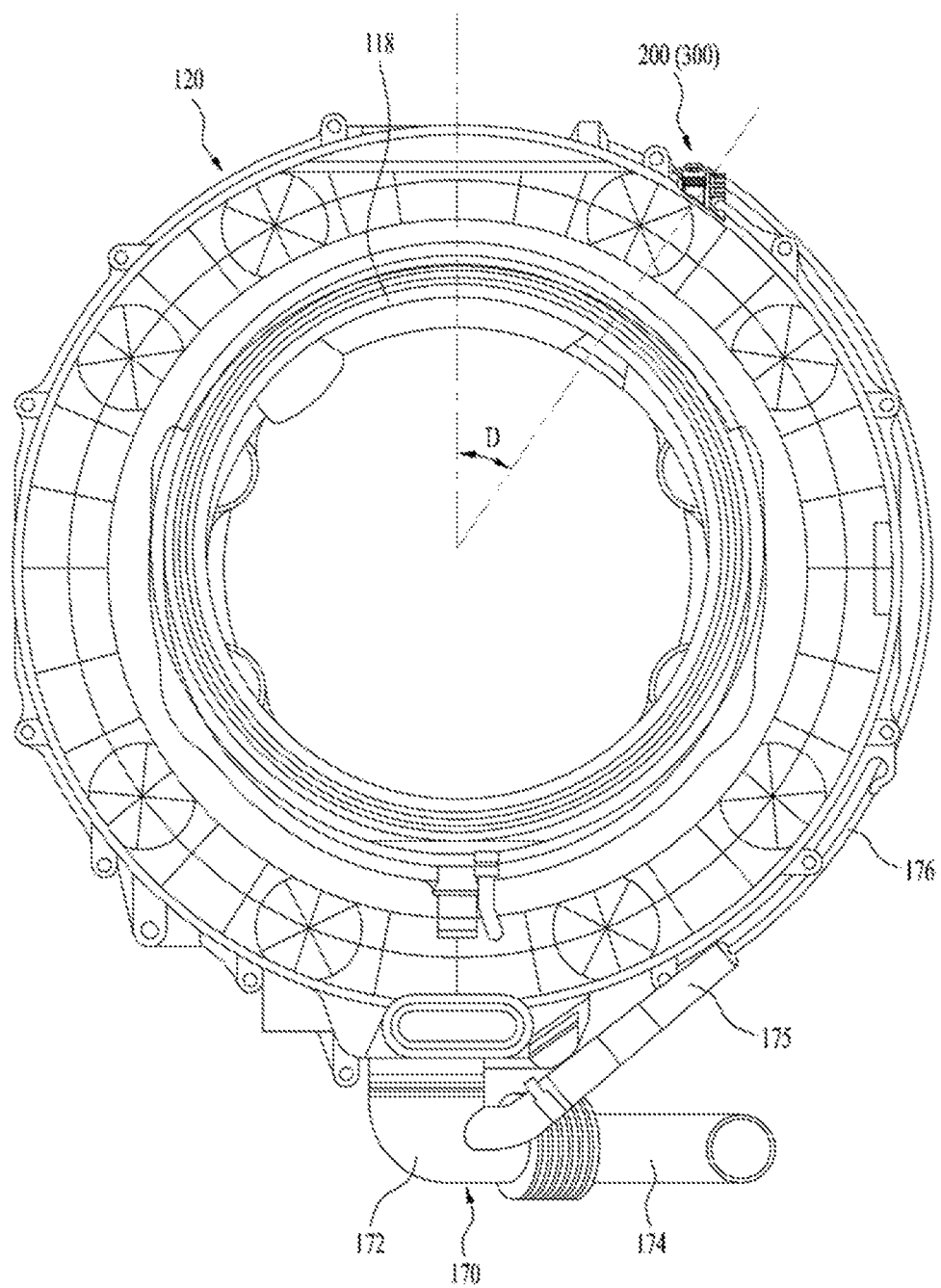
FIG. 3 is a front view illustrating a tub of a laundry treating apparatus according to an embodiment of the present disclosure.

Hereinafter, a laundry treating apparatus according to an embodiment of the present disclosure will be described with reference to FIGS. 1 to 3.

FIG. 1 is a simplified diagram illustrating a laundry treating apparatus according to an embodiment of the present disclosure. Further, FIG. 2 is a perspective view illustrating a tub of a laundry treating apparatus according to an embodiment of the present disclosure. Further, FIG. 3 is a front view illustrating a tub of a laundry treating apparatus according to an embodiment of the present disclosure.

As shown, a laundry treating apparatus 100 according to an embodiment of the present disclosure may include a cabinet 110 forming an outer shape of the apparatus 100, a tub 120 disposed inside the cabinet 110 to store washing water therein, a drum 140 rotatably disposed inside the tub 120 and accommodating laundry therein, and a sensor module 300 that may simultaneously detect a vibration transmitted from the drum 140 to the tub 120 and a water level of the washing water stored in the tub 120.

The cabinet 110 may include an insertion hole 112 defined in a front face of the cabinet 110 and through which the laundry is inserted and withdrawn, and the cabinet 110 may include a door 114 pivotably mounted to the cabinet 110 to open and close the insertion hole 112. In this connection, the door 114 may include an annular door frame 114a and a see-through window 114b disposed at a central portion of the door frame 114a.

Further, a control panel 116 is disposed at an upper end of a front face of the cabinet 110. The control panel 116 may include a plurality of buttons or knobs for manipulating an operation of the laundry treating apparatus 100, and may include a display for displaying an operating state of the laundry treating apparatus 100.

In this connection, in definition of directions to help understanding of a detailed structure of the laundry treating apparatus 100 to be described below, a direction toward the door 114 on the basis of a central portion of the cabinet 110 may be defined as a front direction.

In addition, an opposite direction of the direction toward the door 114 may be defined as a rear direction, and a right direction and a left direction may be defined naturally depending on the front and rear directions defined above.

In one example, the tub 120 may be installed such that a longitudinal axis is parallel to a bottom face of the cabinet 110 or installed to be inclined so as to maintain an inclination of 0 to 30° such that a front side of the tub 120 is upward with respect to a rear side of the tub 120. A spring 120a and a damper 120b for damping a vibration of the tub 120 and preventing the vibration of the tub 120 from being transmitted to the cabinet 110 are respectively disposed on a front face and a rear face of the tub 120.

In this connection, a tub opening 122 for the laundry inserted through the insertion hole 112 of the cabinet 110 to be inserted into the drum 140 disposed inside the tub 120 is defined in a front face of the tub 120.

In addition, a bellows-shaped gasket 118 for sealing between the tub 120 and the cabinet 110 is disposed between the tubing opening 122 and the insertion hole 112 of the cabinet 110, and a water supply hose 164, a detergent supply 166, a circulation hose (not shown), and the like, which will be described later, may be connected to the gasket 118.

In one example, a rotation shaft 124 penetrating the rear face of the but 120 is disposed on the rear face of the tub 120 to be supported by a bearing housing 126. Further, the rotation shaft 124 is connected to a spyder 128 on a rear face of the drum 140 located inside the tub 120. The rotation shaft 124 is connected to a motor 150 disposed on an outer face of the rear face of the tub 120.

In this connection, the motor 150 may include a stator 152 fixed on the rear face of the tub 120 and a rotor 154 formed on an outer circumferential face of the stator 152 and connected to the rotation shaft 124. Various embodiments are available for the motor 150, so that a detailed description thereof will be omitted.

In addition, a water supplier 160 including a water supply valve 162 and the water supply hose 164 for supplying the washing water supplied from an external washing water supply source (not shown) to the tub 120 is disposed above the tub 120.

In one example, the detergent supply 166 that, in addition to supply of the washing water, mixes detergent, fabric softener, bleach, and the like, which are separately inserted, with the washing water and supply the mixture to the tub 120 may be further included to the water supply hose 164 of the water supplier 160.

In this connection, the detergent supply 166 may be disposed in a form of a drawer which is disposed at the upper end of the front face of the cabinet 110 and extended in the forward direction. Such detergent supply 166 is disposed at one side of the front control panel 116 of the cabinet 110.

In one example, a portion into which the detergent is inserted and stored and a portion exposed to the front face of the detergent supply 166 may be integrally formed, or a portion forming at least a portion of the front face of the detergent supply 166 may be formed as a separate component and coupled to the portion into which the detergent is inserted and stored to form the detergent supply 166.

Further, a water discharger 170 including a water discharge pump 172 and a water discharge hose 174 for discharging and draining washing water that is supplied into the tub 120 to complete washing and rinsing and washing water generated during spin-drying is disposed below the tub 120.

In this connection, an air chamber 175 for detecting the water level of the washing water of the tub 120 using a pressure of the washing water stored in the tub 120 is disposed at an inlet side of the water discharge pump 172 of the water discharger 170, and the air chamber 175 is connected with a sensor module 300 to be described later by a water level detecting pipe 176.

In one example, the water level detecting pipe 176 extends along an outer circumferential face of the tub 120 from below the tub 120 where the air chamber 175 is located and connected to the sensor module 300 located at a front or a rear portion of the tub 120. Further, the water level detecting pipe 176 is disposed to transmit pressure change of an air that changes based on the water level of the washing water in the air chamber 175 to the sensor module 300.

In addition, the remaining portion of the water level detecting pipe 176 except for an end of the water level detecting pipe 176 connected to the sensor module 300 to connect the air chamber 175 and the sensor module 300 with each other is preferably extended to a position lower than a position where the sensor module 300 is formed.

That is, in a connection relationship between the air chamber 175, the water level detecting pipe 176, and the sensor module 300, the sensor module 300 is located at a topmost position and the air chamber 175 is located at a bottommost position, and the water level detecting pipe 176 connects the air chamber 175 and the sensor module 300 with each other.

In one example, the connection relationship between the air chamber 175, the water level detecting pipe 176, and the sensor module 300 is for preventing a malfunction of the sensor module 300 by preventing moisture generated in the air chamber 175 and washing water flowing back through the air chamber 175 from flowing into the sensor module 300.

That is, the sensor module 300 is located relatively higher than an entire region of the water level detecting pipe 176 to prevent the washing water or the moisture from flowing into the sensor module 300.

In one example, the sensor module mount 200 on which the sensor module 300 is installed is disposed at one side of a front and upper portion of the tub 120. In this connection, the sensor module mount 200 may be selectively positioned on a front or a rear portion of an outer circumferential face of the tub 120 as shown in FIGS. 2 to 3.

In this connection, it is preferable that the sensor module mount 200 is positioned on a front or rear portion of the tub 120 and at a position spaced, by a predetermined angular spacing, from a front center of the tub 120, in consideration of ease of installation and a clearance of the sensor module 300.

That is, the tub 120 is formed in a cylindrical shape having a central axis in the front and rear direction, and the cabinet 110 is formed in a rectangular shape surrounding the tub 120, so that a relatively triangular space is defined between upper/lower edges of both sides of the cabinet 110 and the outer circumferential face of the tub 120.

Therefore, the sensor module mount 200 may be positioned in the space defined between the tub 120 and the cabinet 110 to improve an internal space utilization of the laundry treating apparatus 100.

In this connection, the sensor module mount 200 is preferably located on the front portion of the tub 120 and at a position spaced, by a predetermined angular spacing of D °, from the front center of the tub 120.

In this connection, in a more detailed description of the position of the sensor module mount 200, the sensor module mount 200 may be formed on the outer circumferential face of the tub 120 at a position spaced, by an angular spacing of between 30° and 60° in a clockwise (or counterclockwise) direction, from a front vertical line of the tub 120. Preferably, the sensor module mount 200 may be formed on the front portion of the outer circumferential face of the tub 120 spaced, by an angular spacing of about 40°, from the front vertical line of the tub 120.

In one example, as described above, the tub 120 may be formed inclined such that the front portion of the tub 120 is upward with respect to the rear portion of the tub 120. When the front portion of the tub 120 is formed to be inclined upwardly, the front upper portion of the tub 120 may be located at a topmost portion of a space where the washing water is stored therein.

Thus, as the sensor module mount 200 is located at the front portion of the top of the tub, a distance to the water level detecting pipe 176 connected to the sensor module 300 may be increased, so that the inflow of the washing water that may be flowed back through the water level detecting pipe 176 may be prevented.

The drum 140 is rotatably disposed inside the tub 120 in a state having a rotation shaft parallel to the tub 120, and a drum opening 12 coaxial with the tub opening 122 is defined in a front face thereof.

Such drum 140 includes a plurality of through holes 211 provided to penetrate an outer circumferential face thereof. The through hole 211 may not only allow the washing water stored in the tub 120 to be flowed into the drum 140, but also allow water discharged from the laundry to be discharged into the internal space of the tub 120. In one example, a lifter 144 for stirring the laundry during rotation of the drum 140 may be further disposed on an inner circumferential face of the drum 140.

The lifter 144 for moving the laundry accommodated inside the drum 140 and a spin-drying hole 146 for discharging the washing water in the drum 140 and washing water contained in the laundry are formed on the inner circumferential face of the drum 140.

Therefore, the user may input the laundry into the internal space of the drum 140 through the insertion hole 112, the tub opening 122, and the drum opening 12, or may withdraw the laundry from the internal space of the drum 140 to the outside.

In one example, the laundry treating apparatus 100 according to the present disclosure as described above includes the sensor module 300 for detecting the water level of the washing water stored in the tub 120 and at the same time detecting the vibration transmitted to the tub 120 during the rotation of the drum 140.

In this connection, the sensor module 300 is fastened and fixed to the sensor module mount 200 which is disposed at one side of the front or rear portion of the top face of the tub 120. In one example, in an embodiment of the present disclosure, it will be described that the sensor module mount 200 is located at one side of the front portion of the top face of the tub 120.

However, the sensor module mount 200 may be selectively positioned at the front portion or the rear portion of the tub 120 depending on the installation position of the sensor module 300, and the position of the sensor module mount 200 is not limited thereto.

The sensor module 300 is inserted into the sensor module mount 200 and detachably fixed and is connected to the water level detecting pipe. In this connection, the sensor module 300 may include a pressure sensor 331 for detecting a pressure of the water level detecting pipe 176 connected to the air chamber 175 to detect the water level of the washing water in the tub 120, and a vibration sensor 332 for detecting the vibration of the tub 120. The sensor module 300 will be described in detail after completing a description of the sensor module mount 200.

Hereinafter, the sensor module 300 and the sensor module mount 200 according to an embodiment of the present disclosure will be described in detail with reference to the accompanying drawings.

Figure 4:
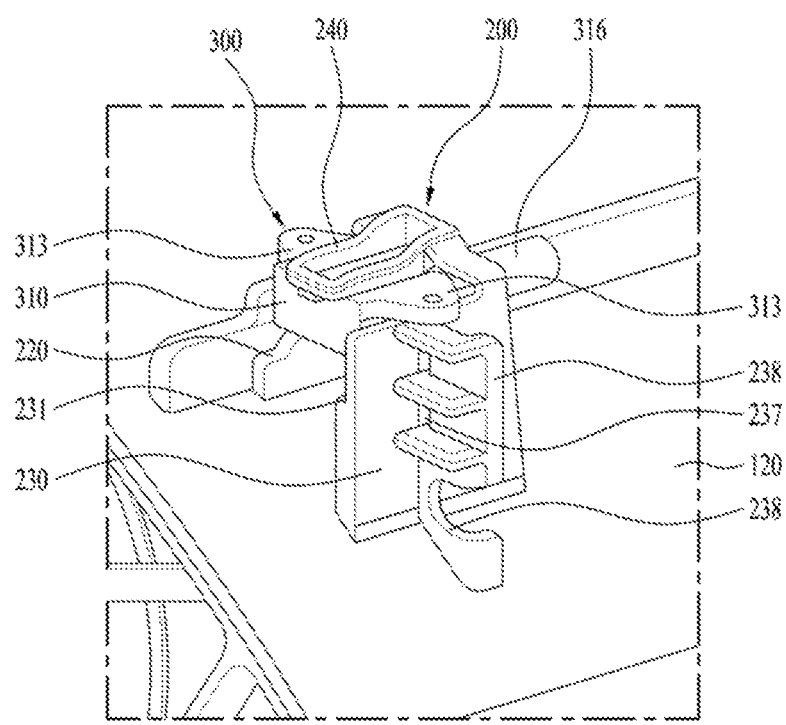
FIG. 4 is a perspective view illustrating a sensor module and a sensor module mount according to an embodiment of the present disclosure.
Figure 5:
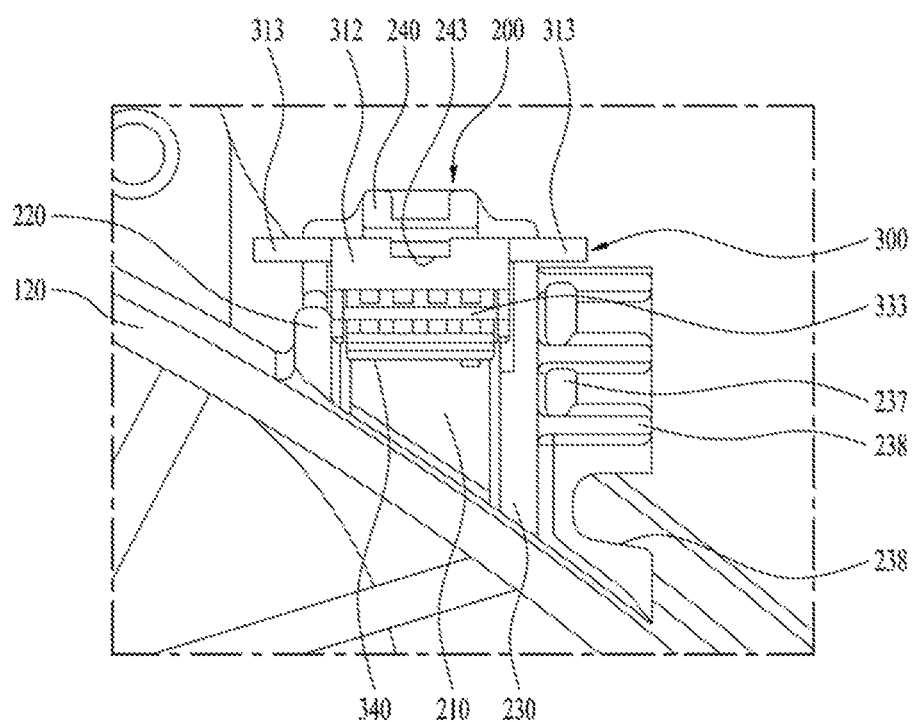
FIG. 5 is a front view illustrating a sensor module and a sensor module mount according to an embodiment of the present disclosure.

FIG. 4 is a perspective view illustrating a sensor module and a sensor module mount according to an embodiment of the present disclosure. Further, FIG. 5 is a front view illustrating a sensor module and a sensor module mount according to an embodiment of the present disclosure. Further, FIG. 6 is a front view illustrating a sensor module mount according to an embodiment of the present disclosure.

As shown, the sensor module mount 200 to which the sensor module 300 is inserted and installed is formed at one side of the front portion of the top face of the tub 120. Such sensor module mount 200 has a space therein in which the sensor module 300 is detachably installed. In addition, the sensor module 300 is detachably inserted and fixed into the sensor module mount 200 and is connected to the air chamber 175 by the water level detecting pipe 176.

Figure 6:
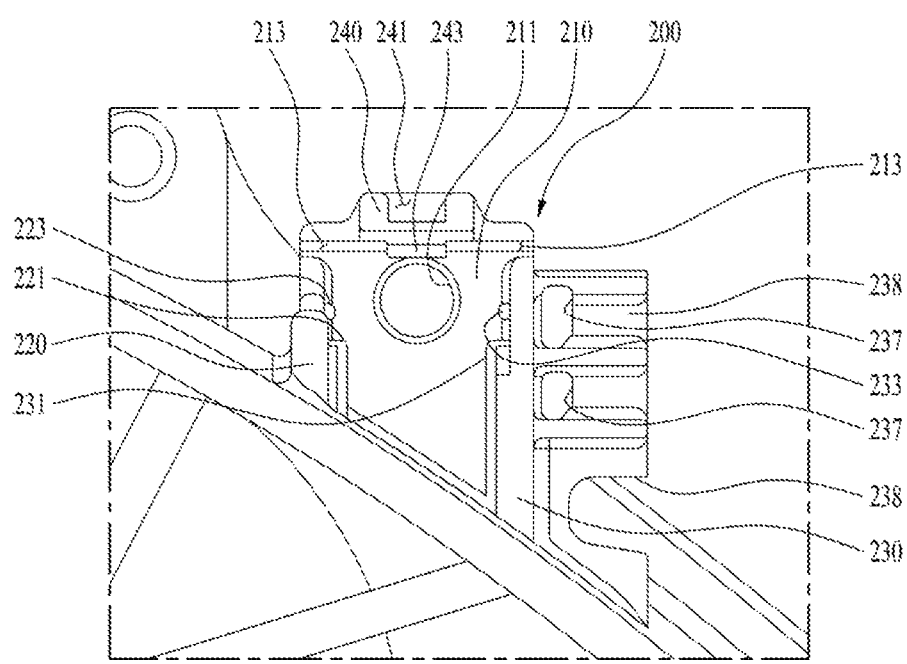
FIG. 6 is a front view illustrating a sensor module mount according to an embodiment of the present disclosure.

As shown in FIG. 6, the sensor module mount 200 includes a support 210 having the through hole 211 defined therein through which the sensor module 300 is inserted, first and second guides 220 and 230 formed at both sides of the support 210 to support both side faces of the sensor module 300, respectively, and an elastic pressing portion 240 formed on a front face of the support 210 and spaced apart from upper ends of the first and second guides 220 and 230 by a predetermined spacing, wherein the elastic pressing portion 240 elastically supports the sensor module 300.

In this connection, the support 210 is formed in a plate shape of a predetermined height, and the through hole 211 to which a pipe connector 316 of the sensor module 300 to be described below is inserted to extend rearward is defined in an upper central portion of the support 210.

The first guide 220 extends and protrudes from one side edge of the support 210 in the front direction of the tub 120 to guide one side face of the sensor module 300 and at the same time to support one side of a bottom face of the sensor module 300.

Such first guide 220 includes a first support step 221 having a protruding portion of a bottom face facing the second guide 230 to support one side lower edge of the sensor module 300, and a first guide protrusion 223 formed above the first support step 221, spaced apart from the first support step 221 by a predetermined spacing, extending in an insertion direction of the sensor module 300, and in contact with one side face of the sensor module 300 to guide a movement of the sensor module 300 when the sensor module 300 is inserted.

The second guide 230 extends and protrudes in the front direction of the tub 120 in a state parallel to the first guide from the other side edge of the support 210 to guide the other side face of the sensor module 300 and at the same time support the other side bottom face of the sensor module 300.

Such second guide 230 includes a second support step 231 having a protruding portion of a bottom face facing the first guide 220 to support the other side lower edge of the sensor module 300, and a second guide protrusion 233 formed above the second support step 231, spaced apart from the second support step 231 by a predetermined spacing, extending in the insertion direction of the sensor module 300, and in contact with the other side face of the sensor module 300 to guide the movement of the sensor module 300 when the sensor module 300 is inserted.

In this connection, the bottom face of the sensor module 300 is supported by the first support step 221 formed at the first guide 220 and the second support step 231 formed at the second guide 230, and an upper portion of the sensor module 300 is supported by the elastic pressing portion 240, so that a vertical movement of the sensor module 300 is restricted.

In addition, the first guide protrusion 223 of the first guide 220 and the second guide protrusion 233 of the second guide 230 respectively press one side face and the other side face of the sensor module 300, so that a horizontal movement of the sensor module 300 is restricted.

In one example, the elastic pressing portion 240 is formed so as to protrude from an upper end of the support 210 in the front direction of the tub 120. In this connection, the elastic pressing portion 240 protrudes such that insertion spaces 213 respectively spaced at a predetermined spacing from the upper ends of the first and second guides 220 and 230 are defined. In this connection, each of the insertion spaces 213 respectively defined between the elastic pressing portion 240 and the first guide 220 and between the elastic pressing portion 240 and the second guide 230 defines a space into which each inserted protrusion 313 of the sensor module 300 to be described later is inserted.

In addition, a hook protrusion for mounting an upper end of a front face of the sensor module protrudes downward from an end of the elastic pressing portion 240. As the sensor module 300 is mounted in the sensor module mount 200, the sensor module 300 is inserted while the elastic pressing portion 240 is deformed upward. Further, when the sensor module 300 is fully inserted into the sensor module mount 200, the hook protrusion 243 is mounted on the upper end of the front face of the sensor module 300 to fix the sensor module 300.

In this connection, in the sensor module 300 mounted in the sensor module mount 200, a rear portion of the sensor module 300 is supported by the support 210 of the sensor module mount 200, and a front portion of the sensor module 300 is supported by the hook protrusion 243 of the elastic pressing portion 240. Accordingly, a movement of the sensor module 300 in a front and rear direction is restricted by the support 210 and the hook protrusion 243.

In one example, the first guide 220 and the second guide 230 of the sensor module mount 200 are arranged in a circumferential direction on the outer circumferential face of the tub 120, and the sensor module 300 mounted in the sensor module mount 200 is mounted in a horizontal state. Therefore, the second guide 230 is formed relatively longer than the first guide 220.

In this connection, an extension rib 238 to which a harness (not shown) that reinforces a strength of the second guide 230, and at the same time, is connected to the sensor module 300, the water level detecting pipe 176, and the like are fixed may be further formed outwardly of the second guide 230. A harness hole 237 for fixing the harness by a separate fastener, a pipe fixing groove 238 for connecting the water level detecting pipe 176, or the like may be further defined in such extension rib 238.

Figure 8:
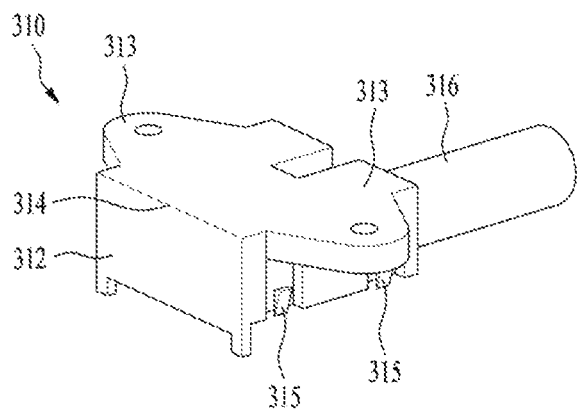
FIG. 8 is an exploded perspective view illustrating a sensor module according to an embodiment of the present disclosure.
Figure 8:
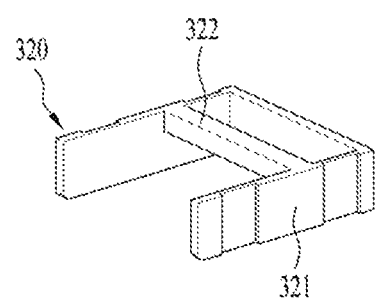
Figure 8:
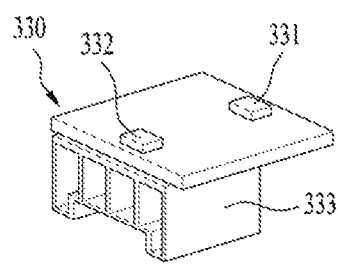
Figure 8:
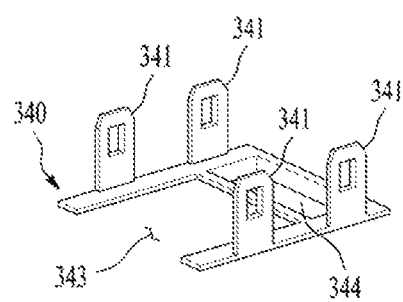
Figure 9:
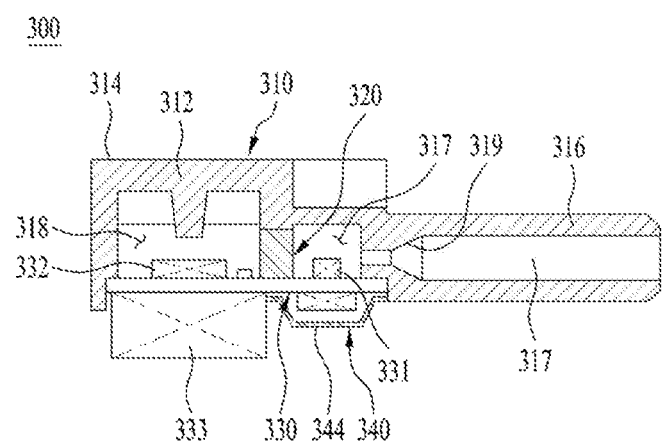
FIG. 9 is a cross-sectional view illustrating a sensor module according to an embodiment of the present disclosure.

Hereinafter, the sensor module will be described in more detail with reference to the accompanying FIGS. 7 to 9.

Figure 7:
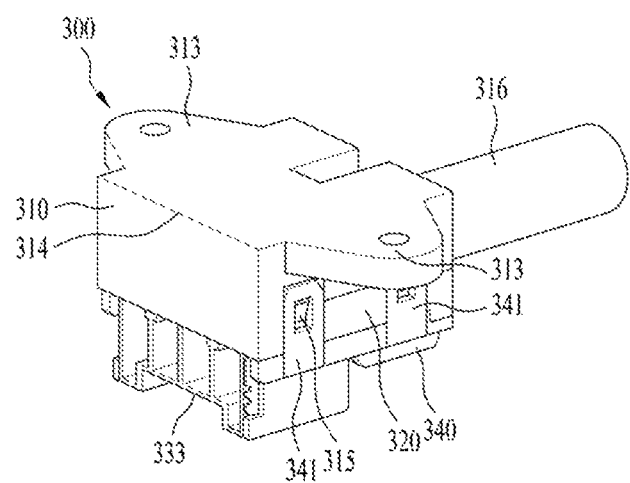
FIG. 7 is a perspective view illustrating a sensor module according to an embodiment of the present disclosure.

FIG. 7 is a perspective view illustrating a sensor module according to an embodiment of the present disclosure. Further, FIG. 8 is an exploded perspective view illustrating a sensor module according to an embodiment of the present disclosure. Further, FIG. 9 is a cross-sectional view illustrating a sensor module according to an embodiment of the present disclosure.

As shown in FIG. 7, the sensor module 300 according to an embodiment of the present disclosure includes a housing 310 formed in a box shape corresponding to an internal space of the sensor module mount 200 and to which the water level detecting pipe 176 for detecting the water level is connected, a PCB substrate 330 installed in the housing 310 and including the pressure sensor 331 for detecting the water level of the washing water and the vibration sensor 332 for detecting the vibration of the tub 120, a PCB guide 320 for supporting the PCB substrate and at the same time being seated in the housing, and a fixing cover 340 for fixing the PCB substrate supported by the PCB guide 320 and the PCB guide to the housing.

The housing 310 includes a box 312 into which the PCB substrate 330 and the PCB guide 320 are inserted and installed, and the pipe connector 316 extending from a rear face of the box and protruding to be inserted into the water level detecting pipe 176 connected to the air chamber 175.

In this connection, a bottom face of the box 312 is formed to be opened such that the PCB substrate 330 and the PCB guide 320 are inserted and installed into the bottom face thereof. A pair of inserted protrusions 313 are formed at both sides of an upper portion of the box 312 to be respectively inserted into the insertion spaces 213 at both sides of the sensor module mount 200.

In this connection, when the sensor module 300 is inserted into and fastened to the sensor module mount 200, the inserted protrusion 313 may restrict a vertical directionality of the sensor module 300 to prevent the sensor module 300 from being fastened to the sensor module mount 200 in an inverted state.

In addition, a vibration sensor space 318 in which the vibration sensor 332 of the PCB substrate 330 is located is defined at a front portion of an internal space of the box 312. A pressure sensor space 317 in which the pressure sensor 331 of the PCB substrate 330 is defined at a rear portion of the internal space of the box 312. In this connection, the pressure sensor space 317 is defined to be in communication with the pipe connector 316.

In one example, the vibration sensor space 318 and the pressure sensor space 317 are preferably sealed as the PCB substrate 330 and the PCB guide 320 are fastened to prevent inflow of moisture (e.g., washing water, steam, and the like) from the outside of the box 312.

In addition, a plurality of fixing protrusions 315 to which elastic fixing pieces 341 included in the fixing cover 340 to be described later are respectively mounted protrude from both side faces of the box 312. Further, a stopper 314 to which the hook protrusion 243 of the elastic pressing portion 240 included in the sensor module mount 200 is formed at a front upper portion of the box 312.

Further, the pipe connector 316 extends integrally with the box 312 from the rear face of the box 312 and in communication with the pressure sensor space 317 defined in the box 312. Such pipe connector 316 has a channel 317 defined therein in communication with the pressure sensor space 317.

In this connection, the pipe connector 316 is connected to the water level detecting pipe 176 to transfer the pressure of the water level detecting pipe 176 to the pressure sensor space 317 of the box 312, so that the pressure sensor 331 located in the pressure sensor space 317 may sense the pressure to determine the water level.

That is, in the pipe connector 316, air whose pressure is changed based on the water level of the washing water being stored in the tub 120 flows along the channel 317, and the air flowed along the channel may be detected by the pressure sensor in the pressure sensor space.

Further, a cross-sectional area reduction portion 319 for reducing a cross-sectional area of the channel to improve a responsiveness of the pressure sensor 331 by the air flowing along the channel 317 may be further formed at a predetermined portion of the channel 317 formed at the pipe connector.

The PCB guide 320 supports the PCB substrate 330 inserted into the box 312 of the housing 310 and simultaneously restricts an assembly direction of the PCB substrate 330. Such PCB guide 320 includes an outer peripheral guide 321 having a rectangular frame shape in which one side corresponding to the front side of the box 312 is opened and into which the PCB substrate 330 is inserted and seated, and a support guide 322 that maintains the shape of the outer peripheral guide 321 by connecting both sides of the outer peripheral guide 321 with each other, and at the same time, is in contact with and supports a top face of the PCB substrate 330.

The PCB substrate 330 may include the pressure sensor 331 for detecting the water level of the washing water stored in the tub 120, the vibration sensor 332 for detecting the vibration of the tub 120, and a terminal 333 for transmitting sensed values detected by the pressure sensor 331 and vibration sensor 332 to a controller (not shown).

In this connection, the pressure sensor and the vibration sensor arranged on the PCB substrate are located on the same face of the PCB substrate, and are respectively located in the pressure sensor space and the vibration sensor space defined in the box.

In one example, the pressure sensor 331 may include a piezoelectric sensor element, and the piezoelectric sensor element utilizes a piezoelectric effect of converting a pressure into an electrical signal when the pressure is applied.

In addition, the vibration sensor 332 may be provided as a six-axis gyro sensor that may detect the vibration of the tub 120 based on the vibration and the rotation direction of the tub 120, and the vibration sensor 332 may detect vibrations in the front and rear direction, in the left and right direction, and in the up and down direction of the tub 120.

In this connection, the controller provided separately based on the sensed value sensed by the vibration sensor 332 may calculate a magnitude of the vibration and a phase of the vibration, calculate a magnitude of imbalance due to the laundry inside the drum 140 through the magnitude of the vibration (that is, an amplitude of the vibration), and calculate a position of the imbalance inside the drum 140 through a difference in the phase of the vibration.

The fixing cover 340 is fastened to the housing 310 is to protect the PCB substrate while preventing separation of the PCB substrate 330 and the PCB guide 320. Such fixing cover 340 covers the open bottom face of the box of the housing 310, and at the same time, includes a terminal exposing portion 343 exposing the terminal 333 of the PCB substrate 330 at a front portion of the fixing cover 340 and a protecting portion 344 covering electrical components arranged on the PCB substrate 330 therein.

In addition, a plurality of elastic fixing portions respectively mounted to the fixing protrusions 315 formed on the both side faces of the housing 310 are formed at both sides of the fixing cover 340. Further, each mounting groove 342 into which the hook protrusion 243 is inserted is defined at an end of each elastic fixing portion 341.

The sensor module as described above may be inserted into the sensor module mount 200 in a state in which the housing 310, the PCB substrate 330, the PCB guide 320, and the fixing cover 340 are fastened with each other.

In this connection, in the sensor module 300 installed into the sensor module mount 200, the top and bottom faces of the sensor module 300 are supported by the first and second steps 221 and 231 respectively formed on the first and second guides 220 and 230 of the sensor module mount 200, so that the movement of the sensor module 300 in the vertical direction may be restricted.

In addition, in the sensor module 300 installed into the sensor module mount 200, the both side faces of the sensor module 300 are respectively supported by the first guide protrusion 223 of the first guide 220 and the second guide protrusion 233 of the second guide 230, so that the movement of the sensor module 300 in the left and right direction may be restricted.

In addition, in the sensor module 300 installed into the sensor module mount 200, the front and rear portions of the sensor module 300 are respectively supported by the hook protrusion 243 of the elastic pressing portion 240 and the support 210 of the sensor module mount 200, so that the movement of the sensor module 300 in the front and rear direction may be restricted.

In addition, in the sensor module 300 as described above, the pressure sensor 331 for detecting the water level of the tub 120 and the vibration sensor 332 for detecting the vibration of the tub 120 are integrally formed with each other, and the sensor module 300 is installed by a single process of mounting the sensor module 300 into the sensor module mount 200 formed on the rear portion of the top of the tub 120, so that the manufacturing processes of the laundry treating apparatus 100 may be simplified.

As described above, although the preferred embodiments of the present disclosure have been described in detail, the present disclosure is not limited thereto, but may be variously modified and altered by those skilled in the art to which the present disclosure pertains without departing from the spirit and scope of the present disclosure claimed in the following claims. Thus, modifications of the aforementioned embodiments of the present disclosure will not be departed from the scope of the present disclosure.

What is claimed is:

1. A laundry treating apparatus comprising:
   a tub;
   a drum rotatably disposed inside the tub;
   a water discharger configured to discharge washing water from the tub;
   a water level detecting pipe disposed at the water discharger and configured to carry air, wherein a pressure change of the air corresponds to a water level of washing water in the tub;
   a sensor module connected to the water level detecting pipe and configured to detect the water level of washing water in the tub and a vibration of the tub, the sensor module comprising:
      a housing that is in communication with the water level detecting pipe and defines an opened portion,
      a cover that covers the opened portion of the housing while exposing a portion of the sensor module, and
      a pipe connector that is disposed rearward of the housing, that is in communication with an inner space of the housing, and that is connected to the water level detecting pipe; and
   a sensor module mount that is disposed on an upper portion of an outer circumferential surface of the tub and that receives the sensor module therein,
   wherein the sensor module mount comprises a support that supports a rear surface of the sensor module and defines a through hole that receives the pipe connector,
   wherein the sensor module is inserted into the sensor module mount in a direction from a front side of the tub to a rear side of the tub, and
   wherein the pipe connector is inserted into the through hole of the support in the direction from the front side of the tub to the rear side of the tub, exposed to a rear side of the support, and connected to the water level detecting pipe at the rear side of the support.

2. The laundry treating apparatus of claim 1, wherein the sensor module mount is disposed at a front portion of the tub.

3. The laundry treating apparatus of claim 1, wherein the sensor module mount is disposed at a front portion of the tub, and is positioned on the outer circumferential surface of the tub within an angular spacing of 30° to 60° with respect to a vertical line passing through a center of the tub.

4. The laundry treating apparatus of claim 1, wherein the sensor module mount is disposed at a front portion of the tub, and is positioned on the outer circumferential surface of the tub at a position corresponding to an angular spacing of about 40° with respect to a vertical line passing through a center of the tub.

5. The laundry treating apparatus of claim 1, wherein the water discharger comprises an air chamber configured to accommodate air,
   wherein a pressure of air in the air chamber is configured to change based on the water level of washing water in the tub, and
   wherein the water level detecting pipe is positioned vertically below the sensor module in a region between the air chamber and the sensor module.

6. The laundry treating apparatus of claim 1, wherein the sensor module mount comprises:
   a first guide comprising a first guide protrusion that supports a first lateral side surface of the sensor module; and a second guide comprising a second guide protrusion that supports a lateral second side surface of the sensor module, and wherein the first guide protrusion and the second guide protrusion are configured to restrict movement of the sensor module in a left-right direction.

7. The laundry treating apparatus of claim 6, wherein the sensor module mount further comprises an elastic pressing portion that extends from the support to a front surface of the sensor module and that is coupled to the front surface of the sensor module, wherein the support is disposed between the first guide and the second guide, and wherein the support and the elastic pressing portion are configured to restrict movement of the sensor module in a front-rear direction.

8. The laundry treating apparatus of claim 7, wherein the sensor module mount further comprises:

a first support step portion that is disposed at the first guide and that supports a first side of a bottom surface of the sensor module; and a second support step portion that is disposed at the second guide and that supports a second side of the bottom surface of the sensor module, and wherein the first support step portion, the second support step portion, and the elastic pressing portion are configured to restrict movement of the sensor module in an up-down direction.

9. The laundry treating apparatus of claim 1, wherein the sensor module mount further comprises:

a first guide that extends from a first side of the support and that supports a first lateral side surface of the sensor module;

a second guide that extends from a second side of the support and that supports a second lateral side surface of the sensor module; and an elastic pressing portion disposed on a top portion of the support and that is configured to generate an elastic force to thereby provide pressure to the sensor module.

10. The laundry treating apparatus of claim 9, wherein the sensor module mount further comprises:

a first step portion that is disposed on the first guide and that supports a first side of a bottom surface of the sensor module; and a second step portion that is disposed on the second guide and that supports a second side of the bottom surface of the sensor module, and wherein the elastic pressing portion is configured to support a top surface of the sensor module.

11. The laundry treating apparatus of claim 9, wherein the sensor module mount further comprises:

a first guide protrusion that protrudes from the first guide and that supports the first lateral side surface of the sensor module; and a second guide protrusion that protrudes from the second guide toward the first guide protrusion, that faces the first guide protrusion, and that supports the second lateral side surface of the sensor module.

12. The laundry treating apparatus of claim 9, wherein the sensor module mount further comprises:

a hook protrusion disposed on the elastic pressing portion and coupled to a top portion of a front surface of the sensor module.

13. The laundry treating apparatus of claim 1, wherein the sensor module further comprises a printed circuit board (PCB) substrate mounted inside the housing, the PCB substrate comprising:

a pressure sensor configured to detect a pressure in the water level detecting pipe, a vibration sensor configured to detect the vibration of the tub, and a terminal configured to transmit sensed values of the pressure sensor and the vibration sensor, and wherein the cover covers the opened portion of the housing while exposing the terminal.

14. The laundry treating apparatus of claim 13, wherein the housing defines:

a pressure sensor space that is in communication with the water level detecting pipe and that accommodates the pressure sensor therein; and a vibration sensor space that is separated from the pressure sensor space and that accommodates the vibration sensor therein.

15. The laundry treating apparatus of claim 1, wherein the support comprises a plate that defines the through hole at an upper center portion thereof, the plate protruding upward from the outer circumferential surface of the tub, and wherein a bottom surface of the plate extends along the outer circumferential surface of the tub.

* * * * *